United States Patent

Kigel et al.

[11] Patent Number: 6,159,365
[45] Date of Patent: Dec. 12, 2000

[54] METHOD AND APPARATUS FOR TREATING CONTAMINATED WATER

[75] Inventors: Mark Y. Kigel, East Brunswick, N.J.; Mikhail Kofman, New York; Tamara V. Vishkina, Brooklyn, both of N.Y.; Krum Cyril Wekilsky, Boonton, N.J.

[73] Assignee: American EnviroCare, Inc., East Brunswick, N.J.

[21] Appl. No.: 09/219,231

[22] Filed: Dec. 23, 1998

Related U.S. Application Data

[60] Provisional application No. 60/070,871, Jan. 9, 1998.

[51] Int. Cl.⁷ .................................................. C02F 3/06
[52] U.S. Cl. ......................... 210/151; 210/194; 210/256
[58] Field of Search .................................. 210/150, 151, 210/194, 195.1, 202, 220, 256, 258, 259

[56] References Cited

U.S. PATENT DOCUMENTS

| | | |
|---|---|---|
| 3,929,640 | 12/1975 | Dohnert . |
| 3,956,128 | 5/1976 | Turner . |
| 4,008,159 | 2/1977 | Besik ...................................... 210/151 |
| 4,136,012 | 1/1979 | Louboutin et al. . |
| 4,192,742 | 3/1980 | Bernard et al. . |
| 4,482,458 | 11/1984 | Rovel et al. ............................. 210/150 |
| 4,547,286 | 10/1985 | Hsiung . |
| 4,707,252 | 11/1987 | Durot et al. . |
| 4,720,347 | 1/1988 | Berne . |
| 4,787,978 | 11/1988 | Nicol . |
| 4,869,815 | 9/1989 | Bernard et al. . |
| 4,940,546 | 7/1990 | Vogelpohl et al. ...................... 210/151 |
| 5,035,795 | 7/1991 | Schmid . |
| 5,192,441 | 3/1993 | Sibony et al. .......................... 210/151 |
| 5,441,634 | 8/1995 | Edwards .................................. 210/194 |
| 5,518,618 | 5/1996 | Mulder et al. .......................... 210/151 |
| 5,843,305 | 12/1998 | Kim et al. ............................... 210/151 |
| 5,849,194 | 12/1998 | Yamanski et al. ...................... 210/617 |

OTHER PUBLICATIONS

Dauthuille, Le Densadeg—Un Nouveau Decanteur a Hautes Performances, L'Eau, 1988, @, pp. 63–72.

Tijhuis et al, Water Science Technology, vol. 26, No. 9–11, P. 2015–2019.

*Primary Examiner*—Christopher Upton
*Attorney, Agent, or Firm*—Robert L. Stone

[57] ABSTRACT

A method and apparatus for treating contaminated water are described wherein contaminated natural water or industrial wastewater is treated to remove contaminants in a packaged modular treatment unit.

6 Claims, 2 Drawing Sheets

METHOD AND APPARATUS FOR TREATING CONTAMINATED WATER

This Appln claims the benefit of U.S. Provisional No. 60/070,871 filed Jan. 9, 1998.

FIELD OF THE INVENTION

This invention relates to methods and apparatus for removal of impurities from contaminated water especially contaminated natural water and industrial wastewater. In particular, the invention relates to the methods and apparatus for cumulative removal of organic biodegradable, low-biodegradable and non-biodegradable compounds as well as of suspended solids and trace elements. More particularly, the invention relates to the methods and apparatus for removal of contaminants of natural water sources such as from water taken from rivers, lakes, reservoirs and storm water runoff and the like and from industrial wastewater such as floating, buoyant and settleable matter in both oily globules and solid forms as well as for removal of dissolved inorganic and/or organic contaminants from water and wastewater such as those causing Oil and Grease (OG), Chemical Oxygen Demand (COD), Biochemical Oxygen Demand (BOD), Total Organic Carbon (TOC), color, odor, hardness, forms of nitrogen, phosphorus, Total Suspended Solids (TSS), Petroleum Hydrocarbons (PHC), Volatile Organic Compounds (VOC), Total Dissolved Solids (TDS), and Trace Inorganics (TI).

BACKGROUND AND PRIOR ART

In highly industrialized areas the state and local regulations concerning industrial wastewater discharge in the existing municipal sewers or water bodies are very stringent thus making the cost of industrial wastewater pretreatment very high. Many industrial manufacturers must install and operate local wastewater pretreatment systems which due to their high cost along with the discharge permit fees adversely affect the cost of products. Sometimes the local environmental protection regulations could result in industrial manufacturers having to go out of business. Re-use of the treated effluent within the industrial plant process technologies can minimize the use of potable water resulting in decrease in the cost of permits for wastewater discharges, and, possibly, could eliminate the permit fee completely. Further, even when treated wastewater effluent quality meets the regulatory requirements the discharges could hydraulically overload the existing municipal sewerage and treatment plants. Recycling has been the only practical alternative for increased discharge capacity at local community wastewater treatment plants. Recycled water may be used for spray irrigation of golf courses, public parks and county property, and for make-up water for boilers. Likewise, natural water sources can also be contaminated in its ambient condition with industrial wastes and require more efficient purification.

The main goal of this invention is to develop a cost-effective and efficient method and apparatus for treating contaminated water including natural and industrial wastewater which results in obtaining high purity effluent usable for recycling. The known methods of obtaining high purity effluent from heavily contaminated industrial wastewater are generally based on sequencing particular treatment facilities in a complex treatment train or sequence which usually results in relatively high capital and operational costs of the system. There are known multi-functional treatment systems in which various processes are combined in a reduced number of treatment units.

It is known that treatment of industrial wastewater is provided more cost-effectively and efficiently when high purity effluent usable for recycling results from the treatment. In order to obtain high purity effluent, inorganic and organic suspended solids, oily globules and emulsions, colloidal and dissolved matter, and trace elements should be removed. Total Suspended Solids (TSS) and oily globules have been removed by upward stream and downward stream gravity separation mostly enhanced by adding coagulation and/or flocculation means. In this technology, gravity separation is provided either by sedimentation (downward stream), or by flotation (upward stream), or by filtration. The latter can be implemented either in buoyant or fixed filter media, or in liquid-liquid or liquid-solids fluidized beds. The biodegradable and eventually low-biodegradable organic colloidal and dissolved substrates are biologically oxidized. The non-biodegradable organic colloidal and dissolved substrates are removed by adsorption. The trace elements are removed by ion exchange or by membrane methods.

In many stages of treatment some additives which enhance the liquid-solid separation processes can be used, particularly to enhance coagulation and/or flocculation, such as synthetic organic flocculants. Depending upon the nature and concentration of wastewater impurities the flocculants could be cationic, anionic or non-ionic polymers. Traditional industrial wastewater treatment systems which use combinations of different polymers and/or adsorbents specified for different contaminants consist of sequencing treatment units for each reagent, thus resulting in complex and cost-ineffective treatment plants. For relatively large treatment systems, complex multi-stage treatment plants could be justified. However, for smaller installations the complexity of the treatment systems is a major problem.

On the other hand, the method of treating industrial wastewater by the present invention is based on optimum combinations of various reagents to result in new combined reactive admixtures with an enhanced cumulative action. In fact, the combined reactive admixtures are themselves new reagents. The combination of reagent components results in creation of a new reagent which can cumulatively treat different wastewater impurities, thereby permitting creation of a correspondingly combined packaged treatment apparatus. The total cost of a combined treatment process-apparatus complex unit is much less than the total cost of separate units for separate treatment processes.

The following is a brief description of the known in the art combined process-apparatus complex units.

U.S. Pat. No. 3,929,640 (Dohnert) describes a water treating apparatus incorporating improved mixing and flow mechanisms. The apparatus provides simultaneous water clarification and softening with coagulants and calcium hydroxide and/or soda ash which cumulatively provide removal of suspended, colloidal and dissolved matter. A corresponding hydraulic shape of the apparatus along with a plurality of nozzles through which raw water is introduced in the unit in order to provide internal recirculation, reaction and clarification. The unit is equipped with settled sludge collection and removal means. Although the apparatus has its practical advantages, a drawback is that its use is limited only to physico-chemical treatment of water and, probably, also for some industrial wastewaters. With this apparatus, it seems to be practically impossible to treat oil and grease contaminated wastewater.

A compact apparatus for the purification of wastewater by a physical-chemical treatment described in U.S. Pat. No. 4,136,012 (Louboutin et al) combines the neutralization, coagulation, flocculation, and lamellar decanting within a single unit. The system has advantages if only enhanced clarification is considered. However, it cannot provide high purity effluent since the lamellar cartridges have an increased overflow rate, thus also having a high hydraulic capacity, which does not allow high TSS removal efficiency. Another drawback of the method and of the apparatus is that it is limited to phase separation processes and cannot provide Biochemical Oxygen Demand (BOD) and Chemical Oxygen Demand (COD) removal.

U.S. Pat. No. 4,192,742 (Bernard et al) describes a process and apparatus for biological treatment by superoxygenation of wastewater followed by pressurized biological filtration. This high rate biological treatment process, however, requires separate pretreatment of wastewater in order to remove TSS and oil and grease. Also higher energy consumption can add to the cost of system operation. The described system is a sequencing combination of separate units and is rather complicated. When pretreatment and effluent polishing are required the system becomes even more complicated. Due to the above drawbacks, the described method and apparatus have limited applicability.

Another method and apparatus for the filtration of a suspension by a granular filtration layer is described in U.S. Pat. No. 4,720,347 (Berne) as an upward flow filtration enhanced with air washing and fluidization of the upper layer of filter media. The method has an advantage in its combination of granular filtration and fluidized bed filtration along with simultaneous washing the filter media is an obvious advantage of the method. However, it is applicable only for removal of suspended and colloidal matter. If a flocculation additive is used for enhancing the treatment process, it would increase the possibility of clogging the filter media, thus resulting in increase in fluidization velocities which lead to carry over the filter media. Also, a pretreatment to remove large suspended particles is required.

U.S. Pat. No. 4,547,286 (Hsiung) describes a high rate water filtration process and apparatus having an upflow filter with buoyant filter media and a downflow filter with non-buoyant filter media. The upflow filter is provided with an air washing component which decreases the density of the filter media thus resulting in expansion of the media and minimization of its hydraulic resistance. The system also has a pretreatment unit in which suspended solids are removed. Despite its advantages, it, nevertheless, has a drawback in that it includes sequencing compartments and piping which makes the system relatively complicated. Another drawback is that the system itself cannot provide efficient BOD, COD and Total Organic Carbon (TOC) removal.

U.S. Pat. No. 5,035,795 (Schmid) describes an apparatus for wastewater treatment which combines the processes of flocculation, sedimentation, aeration, sludge return, effluent collection and skimming within a single modular unit. Air lift is used for flocculant recirculation. Despite its advantages, it, nevertheless, has a drawback in that it would be difficult to adapt it for use with high molecular flocculants. Another drawback is that the system requires pretreatment for TSS and Oil and Grease (OG) removal.

U.S. Pat. No. 4,707,252 (Durot et al) describes a fluidized bed reactor for aerobic or non-aerobic biological treatment of wastewater which contains a fluidized bed of granular material. The treatment process is based on the three-phase gas-liquid-solids reactions and includes a device for removing air bubbles, a device for separation of the solid particles from the bacterial floc and from the discharged effluent, and a device for recirculating the effluent which is a means for fluidization of the bed of granular material. Despite its advantages, it, nevertheless, has a drawback in that it is a complex apparatus including many sections and compartments as well as moving parts which add to the cost of its maintenance and operation (O&M). Another drawback of the reactor could be media channeling caused by a plug-flow fluidization regime. The channeled upward flow fluidization can result in inefficient use of the fluidized bed volume.

U.S. Pat. No. 4,869,815 (Bernard et al) describes a fluid bed reactor for biological treatment of liquids which contains granular media fluidized by the liquid to be treated. To avoid channeling, the fluidized media is supported by a flow distribution granular transfer material. The transfer material would compensate for the major disadvantage of the plug-flow fluidization of the fluidized granular media with potential media channeling. However, this has the substantial drawback of making the reactor very complex.

U.S. Pat. No. 3,956,128 (Turner) describes an apparatus for treating industrial and domestic wastewater which is a cylindrical system divided into two concentric tanks, thus forming an intermediate space, considered to be an aeration chamber. Then the liquid is oxygenated under pressure and pumped through a spiral tube for reaction and for transfer of soluble impurities into insoluble suspended particles by a conventional process of biochemical oxidation. The admixture from the spiral tube is released into the central zone where the activated sludge solids rise upward due to dissolved air flotation, is then collected on the surface and returned back to the process, while the separated effluent (subnatant) is removed from the reactor. The system requires pumps and devices for saturation of the liquid with the air as well as devices for collection and removal of floated scum, making the apparatus very complex. Another disadvantage of the reactor is the spiral tube which winds outside the tank, and it is difficult and costly to construct and operate the system.

Dauthuille describes in the article (*LE DENSADEG—Un Nouveau Decanteur à Hautes Performances,* L'Eau, 1988, 2, 63–72) a combination of fixed film biological treatment and high-speed lamella plate separation in an advanced system which is characterized by enhanced biological oxidation for both carbon and nitrogen removal. The upward flow submersed fixed-film media filtration combined with lamella plate phase separation is a complementary apparatus providing biological removal of organic carbon and nitrogen and physical-chemical removal of suspended particles. However, the system has the drawback in that it requires backwashing the fixed-film filter media.

A biofilm airlift suspension reactor (BAS-reactor) described by Tijhuis et al. (*Formation of Biofilms on Small Suspended Particles in Airlift Reactors,* Water Science and Technology, 1992, 26, No. 9–11, 2015–2019) uses small particles as suspended biofilm carrier for aerobic treatment of wastewater. The reactor's hydraulic pattern contains an internal recirculation loop and a three-phase separator which is built into the reactor and is hydraulically connected with the biomass carrying recirculation loop. The biomass detachment process plays a dominant role which is a drawback since it complicates the phase separation process.

U.S. Pat. No. 4,787,978 (Nicol) describes a method for the purification of urban wastewater focused on using more concentrated activated sludge, thus increasing the efficiency of the use of the reaction volume. The increase in activated sludge concentration is achieved by separate thickening of the return sludge in a laminarization (inclined parallel plate or tube) sedimentation tank. However, when compared with the fluidized bed reactors which combine the reaction and phase separation volumes in one apparatus, this method has the substantial disadvantage of being more complicated.

SUMMARY OF THE INVENTION

It is an object of the invention to provide a continuous process and apparatus in a form of a packaged modular type unit (MTU) for conducting physical-chemical and/or biological treatment of contaminated water or wastewater and for obtaining high purity effluent in order to obtain high purity water usable for recycling.

It is another object to simultaneously provide a process of oil and grease removal in a MTU built-in compartment.

It is another object to provide a process of biochemical oxidation in a suspended activated sludge floc fluidized bed reactor (FBR) as a built-in component of the MTU.

It is another object to provide a process of physico-chemical treatment by means of an admixture of a coagulant, a flocculant, a floc formation initiator, and an adsorbent (e.g. aluminum hydroxychloride as a representative coagulant, a synthetic organic flocculant, bentonite, and powdered activated carbon, respectively) in a suspended floc FBR as a built-in component of the MTU.

It is a further object to provide an FBR with appropriate hydraulic conditions for high-efficiency gas saturation (aeration) for stripping the volatile organic compounds (VOC), gas (air) bubble removal, formation of at least one or multiple fluidized bed(s), liquid mass recirculation between all hydraulic zones, maintaining a higher reaction mass concentration within the reaction volumes, obtaining high purity reaction effluent within same reactor, and removal and thickening of excess sludge.

It is a further object to provide the above fluidized bed reactor with appropriate hydraulic conditions for high-efficiency ozone saturation for chemical oxidation of organic material.

It is a further object to provide the above fluidized bed reactor with appropriate hydraulic conditions for high-efficiency ozone saturation for iron and manganese removal, for instance, for conversion of ferrous ions ($Fe^{2+}$) to ferric ions ($Fe^{3+}$) with subsequent formation of insoluble hydroxides.

It is a further object to provide a built-in granular media filter compartment which is hydraulically connected with the fluidized bed reactor, with the media containing a reacting material or a mixture thereof such as filtrating media, ion exchange material, granular adsorbent, contact coagulation bed, and the like.

It is a further object to provide a method for simultaneous removal of organics and trace inorganics within the fluidized bed reactor by a mixture of biomass and an adsorbent, particularly powdered activated carbon with spontaneous adsorbent regeneration by biomass organisms.

It is a further object to provide a method for simultaneous removal of organics and trace inorganics within the fluidized bed reactor by a mixture of synthetic organic flocculant, particularly of the Magnifloc, Superfloc or Excell series, and an adsorbent, particularly powdered activated carbon.

It is a further object to provide a method for simultaneous removal of organics and trace inorganics within the fluidized bed reactor by a mixture of a coagulant, e.g. aluminum oxychloride, or hydroxychloride(s) or aluminum sulfate, or ferric sulfate, and an ion exchange natural material such as zeolite(s), synthetic resin, or an adsorbent, e.g. Purolite resin, "green sand" (a New Jersey natural zeolite), powdered activated carbon, etc.

It is a further object to provide a method for simultaneous removal of organics and trace inorganics within the fluidized bed reactor by a mixture of a clay material, e.g. bentonite as sodium montmorillonite or the like, a synthetic organic flocculant, and an adsorbent particularly powdered activated carbon.

Additional objects will be apparent from consideration of this description.

In accordance with the objects, the invention provides a method and apparatus for water and wastewater treatment for continuous reduction of organic biodegradable, low-biodegradable and non-biodegradable impurities, suspended solids and trace elements.

The method comprises physical air stripping of volatile organics, physical-chemical (such as coagulation and/or flocculation, adsorption, granular and membrane filtration) or biochemical processes and alternative ion exchange processes for obtaining high purity treatment process effluent.

In accordance with certain of its objects, this invention provides a method for treatment of contaminated water including natural water in a fluidized bed reactor comprising introducing contaminated natural water through an input tube in a packaged modular type unit from which it proceeds directly to a distribution pipe, contacting said natural water with a fluidized bed reactor assembly, which contains at least one of each of the following components:

(i) aeration zone;
(ii) recirculation zone with portions for upward and downward flow;
(iii) fluidized bed zone in which said natural water is treated with at least one of coagulant, flocculent or adsorbent;
(iv) clear effluent zone; and
(v) mixing/degassing zone wherein powdered activated carbon is introduced into said fluidized bed reactor to recirculate and suspend in said reactor a carbon/coagulant admixture;

separating the effluent of said natural water by filtration through said fluidized bed; and introducing said fluidized bed effluent into a filtration bed compartment built into said unit, wherein filtrate effluent is collected for removal from said fluidized bed reactor.

In accordance with other of its aspects, this invention provides a method for treatment of contaminated water including industrial wastewater in a fluidized bed reactor comprising introducing said industrial wastewater through an input tube in a packaged modular type unit into a separation compartment in which oil and grease, if present, are separated therefrom and solids are simultaneously separated therefrom, said oil and grease, if present, are removed into a container and said solids pass into an excess sludge compartment in said unit, by providing at least one of (a) bacterial growth under aerobic conditions, (b) coagulation and flocculation of suspended solids and (c) adsorption of dissolved organic material; contacting said thus treated industrial wastewater with a fluidized bed reactor assembly, which contains at least one of each of the following components:

(i) aeration zone;
(ii) recirculation zone with portions for upward and downward flow;
(iii) fluidized bed zone in which said industrial wastewater is treated with at least one of suspended viable biomass for biological treatment or a reaction admixture for physico-chemical treatment in the form of at least one of activated sludge or coagulation-flocculation floc aggregates;

(iv) clear effluent zone; and (v) mixing/degassing zone wherein powdered activated carbon is introduced into said fluidized bed reactor to recirculate and suspend in said reactor at least one of (a) a carbon/coagulant biomass or (b) a carbon/coagulant admixture;

separating the effluent of said industrial wastewater by filtration through said fluidized bed and introducing said fluidized bed effluent into a filtration bed compartment built into said unit, wherein filtrate is collected for removal from said fluidized bed reactor.

In accordance with certain of its aspects, this invention provides a packaged modular type unit for treatment of contaminated water comprising:

an input tube, a separation compartment to separate solids and, if present, oil and grease from contaminated water, controlled opening and conduit means for distributing water, including intermediate piping between zones and compartments of said unit to hydraulically connect said zones and compartments, a fluidized bed reactor assembly containing at least one of:

an aeration zone, a recirculation zone with portions for upward and downward flows, a fluidized bed zone, a clear effluent zone, and a mixing/degassing zone and a filtration bed compartment built into said unit, wherein the fluidized bed in said fluidized bed compartment contains suspended viable biomass or a physico-chemical reagent admixture or mixture of said biomass and said physico-chemical reagent admixture and a compartment wherein excess sludge is thickened and removed.

The apparatus contains an FBR which comprises hydraulic zones of one- or multi-stage gas saturation (aeration), recirculation, gas bubble removal, liquid-liquid fluidization bed, clear effluent zone for fluidized bed effluent removal, a built-in filtration compartment, an excess sludge removal and thickening compartment, controlled openings for distribution means and intermediate piping to hydraulically connect all above zones and compartments.

DESCRIPTION OF THE PREFERRED APPARATUS AND TREATMENT METHOD EMBODIMENT

Figure 1:
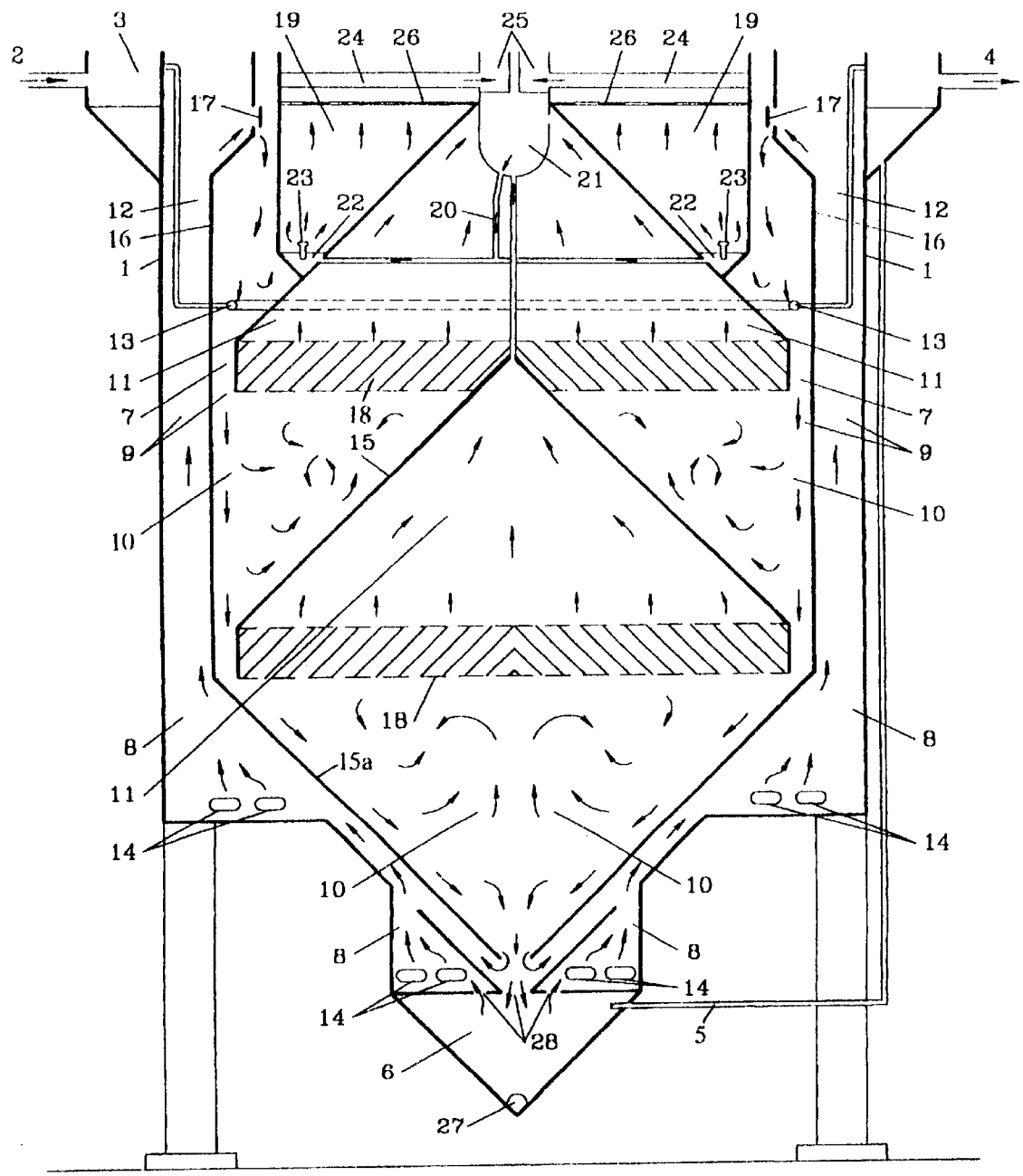
FIG. 1 is a schematic sectional front view of a packaged modular type unit (MTU) based on either a cylindrical or rectangular or polygonal inventive apparatus for accomplishing the inventive method.

The inventive reactor is assembled within encasement 1 (FIGS. 1 and 2) which can be made as a rectangular or circular in plan reservoir with vertical flat or cylindrical walls, respectively. The reservoir's bottom can have either flat or conical or spherical or any other shape. Input tube(s) 2 (FIGS. 1 and 2) introduce raw wastewater to oil/water/solids separation compartment 3 (FIGS. 1 and 2) which is located at the upper level of the unit. Oil and grease are removed from the two-stage oil/water/solids separation compartment 3 by pipe 4 (FIGS. 1 and 2; more particularly in FIG. 2) and accumulated in a separate barrel while the solids are removed by pipe 5 to excess sludge compartment 6. Fluidized bed reactor assembly 7 consists of aeration zone(s) 8, recirculation zone(s) 9, fluidized bed zone(s) 10, clear effluent zone(s) 11, and mixing/degassing zone(s) 12. After oil and grease are removed from the raw wastewater in compartment 3 by pipe 4, wastewater from compartment 3 enters the fluidized bed reactor by means of distribution pipe 13 which is provided with perforated inlet orifices at its bottom level thus introducing the wastewater into the downward flow portion of recirculation zones 9.

When raw or natural water is treated it is introduced into input tube 2 and proceeds directly to distribution pipe 13.

Bubble diffusers 14 are installed in aeration zone 8. Air or ozone or an admixture thereof is introduced under pressure into said aeration zone(s).

Figure 2:
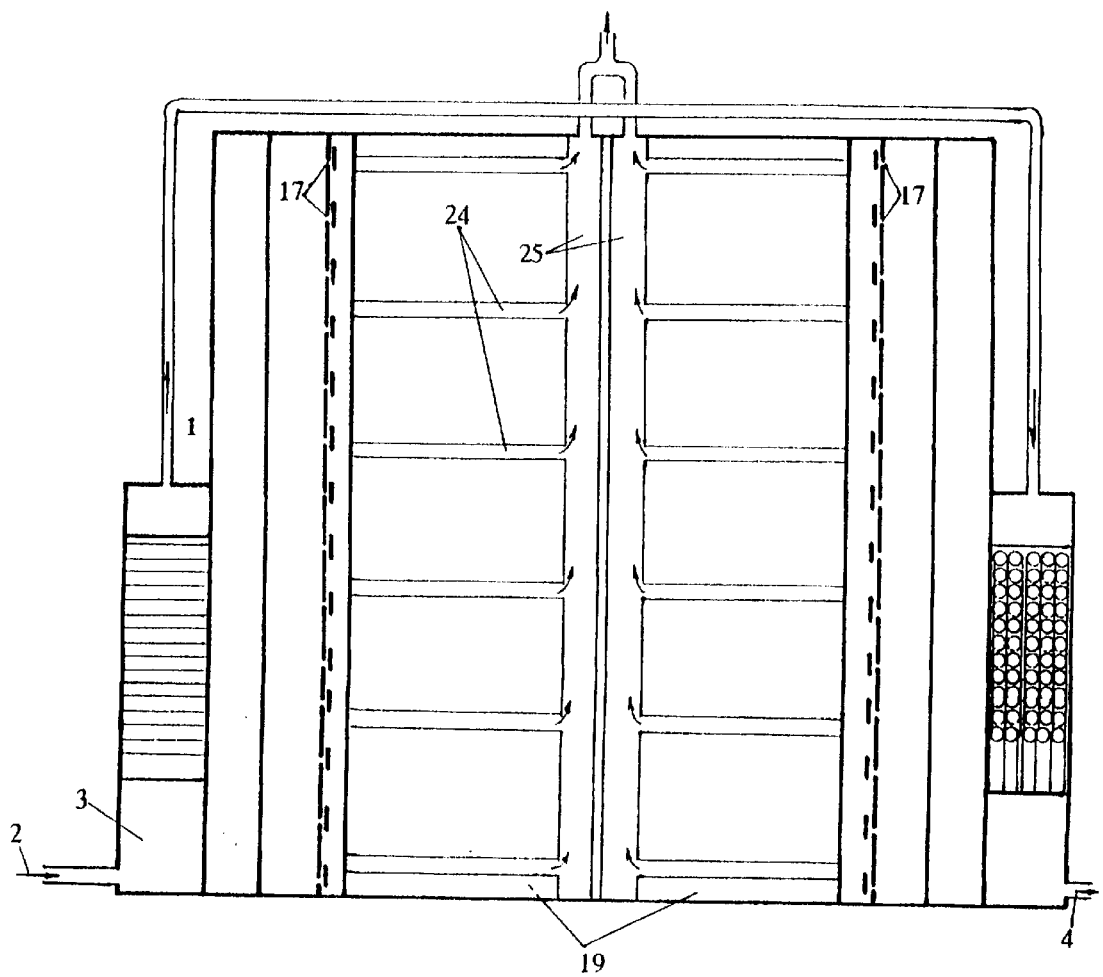
FIG. 2 is a schematic plan view of a packaged modular type unit (MTU).

Partitions or a system of flat or conical partitions 15 is coaxially installed within encasement 1 as shown in FIG. 1. Flat or cylindrical vertical partitions 16 equipped with slide or sluice gates 17 (FIGS. 1 and 2) are hermetically connected at their lower edge to partition 15a. Vertical walls of encasement 1 and partitions 16 jointly form a vertical upward flow portion of recirculation zone(s) 9. A downward flow portion of recirculation zone(s) 9 starts from the upper edge of upper level partition(s) 15 and ends at the lower edge of partition 15a from inside of the latter. Just below the lower edge of partition(s) 15a and inside the confined space limited by partition(s) 15a liquid-liquid fluidization bed zone(s) 10 is(are) formed. There is a possibility to coaxially install one or more levels of partition(s) 15 each above other so that multiple liquid fluidization bed zones can be formed within the reactor between partitions 15. Just above the lower edge of partition(s) 15 and inside the confined conical or prismatic or conical space limited by partition(s) 15 clear effluent zone(s) 11 is (are) formed. Flow laminarization cartridge(s) 18 is(are) installed at the lower level of partition(s) 15 to distinguish the border between hydraulic patterns in zones 10 and 11. Within the space limited by upper partition 15 and partition 16 mixing and degassing zone(s) 12 is(are) formed.

Rectangular or cylindrical vertical built-in filtration bed compartment 19 (FIGS. 1 and 2) is installed just above said mixing and degassing zone(s) 12 leaving a space between its vertical walls and upper level partition 15 for the downward flow portion of recirculation zone(s) 9 and providing bubble release from the gas saturated flow coming from said aeration zone(s) 8 through the upward flow portion of the recirculation zone(s).

Conduit 20 connects treated effluent collection chamber 21 to channels 22 equipped with inlet nozzles 23 through which liquid enters built-in filtration bed compartment 19. Filtration media can consist either of granular inert filtration material like sand or of any ion exchange material or of any sorbent or of a mixture of above. Built-in filtration bed compartment 19 is equipped with treated effluent collection system 24 (FIGS. 1 and 2), filtrate removal system 25 (FIGS. 1 and 2), and grating 26 which prevents filtration media from carrying over when backwashed.

Excess sludge is removed from the reactor by means 27 from compartment 6 where the sludge is thickened and into which the admixture enters through openings 28.

EXAMPLES

Example 1

Testing the Method and Apparatus for Water Treatment

A pilot-scale unit providing both the proposed apparatus and the method for treating natural surface water in order to obtain drinking water is made and tested to confirm the efficiency of treatment. The unit comprises an aeration section which consists of an upward and a downward components thus providing controllable recirculation flow, a fluidized bed section hydraulically connected with the downward component, and of an upward flow filtration section following the aeration section. Air and ozone are alternatively introduced in the upward component of the aeration section. In the unit's fluidized bed section, at least one liquid fluidized bed was formed as a reaction admixture for physico-chemical treatment in the form of coagulation-flocculation floc aggregates. Raw water is introduced into the reactor. A series of nine tests is conducted using coagulation with aluminum sulfate enhanced by flocculation with various synthetic organic flocculants.

Test 1.1: Two-stage treatment with physico-chemical processes in both stages

The raw surface water treatment process is conducted as a two-stage process with the fluidized bed coagulation-flocculation followed by downward flow filtration through the 1.2–1.4 mm sand media. Raw natural river water of low turbidity (1 NTU) and moderate coloration (32 grades) is used. The fluidized bed is formed by adding the $Al_2(SO_4)_3$ solution to the raw water flow in the dosage of 5 mg/L immediately followed by adding the solution of the cationic synthetic organic flocculant Magnifloc®-573C in the dosage of 0.5 mg/L. The solution of Magnifloc®-573C in the dosage of 0.5 mg/L is also introduced to the filter media thus providing a contact coagulation process as the second stage of the physico-chemical treatment. The treatment results in 75% reduction in turbidity, 25% reduction in color, and 20% reduction in Chemical Oxygen Demand (COD).

Test 1.2: Two-stage treatment with physico-chemical process in the first stage and filtration in the second stage Raw natural river water of very low turbidity (0.75 NTU) and moderate coloration (29 grades) is used. The fluidized bed is formed by adding the $Al_2(SO_4)_3$ solution to the raw water flow in the elevated dosage of 10 mg/L immediately followed by adding the solution of the cationic synthetic organic flocculant Magnifloc®-573C in the dosage of 0.5 mg/L. The flocculent is not introduced to the second stage; only downward flow filtration was implemented. The treatment results in 79% reduction in turbidity, 42% reduction in color, and 11% reduction in Chemical Oxygen Demand (COD).

Test 1.3: Two-stage treatment with physico-chemical processes in both stages

Raw natural river water of relatively low turbidity (2 NTU) and moderate coloration (30 grades) is used. The fluidized bed is formed by adding only the solution of a high-molecular non-ionic synthetic organic flocculant in the dosage of 0.5 mg/L to both the first and the second stages. The treatment results in 88% reduction in turbidity, 37% reduction in color, and 5% reduction in Chemical Oxygen Demand (COD).

Test 1.4: Two-stage treatment with simplified physico-chemical processes in both stages The same water as in Test 1.3 is used. The fluidized bed is formed by adding the $Al_2(SO_4)_3$ solution to the raw water flow in the dosage of 10 mg/L immediately followed by adding the solution of a high-molecular non-ionic synthetic organic flocculant in the dosage of 0.5 mg/L. The same high-molecular non-ionic synthetic organic flocculant in the dosage of 0.5 mg/L is introduced to the second stage. The treatment results in 88.3% reduction in turbidity, 44% reduction in color, and 10% reduction in Chemical Oxygen Demand (COD).

Test 1.5: Two-stage treatment with combined physico-chemical processes in both stages Raw natural river water of relatively low turbidity (2 NTU) and moderate coloration (30 grades) is used. The fluidized bed is formed by adding the $Al_2(SO_4)_3$ solution to the raw water flow in the dosage of 10 mg/L immediately followed by adding the solution of a high-molecular non-ionic synthetic organic flocculant in the dosage of 0.5 mg/L. The same combination of aluminum sulfate in the dosage of 10 mg/L and a high-molecular non-ionic synthetic organic flocculant in the dosage of 0.5 mg/L is introduced to the second stage. The treatment results in 94.2% reduction in turbidity, 77% reduction in color, and 57% reduction in Chemical Oxygen Demand (COD).

Test 1.6: Two-stage treatment with physico-chemical process in the first stage and filtration in the second stage Raw natural river water of relatively low turbidity (1 NTU) and moderate coloration (30 grades) is used. The fluidized bed is formed by adding the $Al_2(SO_4)_3$ solution to the raw water flow in the dosage of 5 mg/L immediately followed by adding a high-molecular highly charged synthetic organic cationic flocculant Excel-7000 in the dosage of 0.5 mg/L. No reagent is added to the second stage. The treatment results in 76% reduction in turbidity, 43% reduction in color, and 13% reduction in Chemical Oxygen Demand (COD).

Test 1.7: Two-stage treatment with chemical oxidation process in the first stage and filtration in the second stage Turbid raw natural river water (turbidity-11.2 NTU) and (coloration-36 grades) is used. In the first stage, aeration with ozone was conducted to provide chemical oxidation of organic impurities resulting in formation of floc consisted of oxidized natural water contaminants. No reagents are added to both the first and the second stages. The treatment results in 68.5% reduction in turbidity, 50% reduction in color, and 83.3% reduction in Chemical Oxygen Demand (COD).

Test 1.8: Same treatment process as in Test 1.7 enhanced with physico-chemical contact coagulation in the second stage The treatment results in 66% reduction in turbidity, 74% reduction in color, while COD in the treated water is below detection limit.

Test 1.9: Two-stage treatment with chemical oxidation and physico-chemical process in the first stage and filtration in the second stage Raw natural river water of relatively low turbidity (1.4 NTU) and moderate coloration (30 grades) is used. In the first stage, aeration with an admixture of air and ozone in the ratio of 3 to 1 was conducted along with adding $Al_2(SO_4)_3$ solution to the raw water flow in the dosage of 5 mg/L. Highly charged synthetic organic cationic flocculant Excel-7000 in the dosage of 0.5 mg/L is added to the second stage. The treatment results in non-detectable turbidity in the treated water, 57% reduction in color, and 23% reduction in Chemical Oxygen Demand (COD). Further addition of the cationic flocculant Magnifloc®-573C to the fluidized bed during the test procedure results in 82% reduction in color.

Example 2

Testing the Method and Apparatus for Wastewater Treatment

Industrial landfill wastewater contaminated with oil in concentration of 150 mg/L and COD in the concentrations ranging from 12,000 to 28,000 mg/L is pretreated in a coalescing oil-water separation compartment by oil/grease separation technique described in the present invention followed by physical-chemical treatment and filtration. The oil-water separator is fed with the 10 mg/L solution of the deemulsifying flocculant Magnifloc®-581C added to its mixing/reaction chamber. The oil-water separator effluent contained fine residual emulsified oil with a stable concentration of 10 mg/L. Subsequent treatment is conducted in the same pilot testing unit used in the tests of Example 1.

Physico-chemical treatment is conducted in the fluidized bed using an admixture of bentonite, powdered activated carbon and the synthetic organic cationic flocculant Excel-7000 in the initial ratio of 30:5:5 with the total mixed liquor suspended solids (MLSS) concentration of 5,000 mg/L. The flocculent dosage of the flocculant in the admixture varies from 5 to 50 mg/L, and MLSS varies from 3,000 to 7,000 mg/L in correspondence with the raw wastewater COD values. The stage of physico-chemical treatment results in less than 1 mg/L of residual oil and 120 to 280 mg/L of COD.

The physico-chemical treatment is followed by downward flow filtration through 1.5 mm sand media to which the 0.5 mg/L solution of the anionic synthetic organic flocculant Superfloc®-A100 is added to provide a contact coagulation process. The final effluent is practically contaminant-free.

It is apparent to those skilled in the art that the apparatus and method can be further adapted within the scope of the invention, for instance to remove TDS and trace inorganics using a membrane filtration unit, e.g. fiber hollow membranes for ultrafiltration or reverse osmosis as hyperfiltration after the procedure in the MTU.

What is claimed is:

1. An encased packaged modular type unit for treatment of contaminated water comprising
   an input tube,
   a separation compartment to separate solids and, if present, oil and grease in contaminated water,
   controlled openings and conduit means for distributing water, including intermediate piping between zones and compartments of said unit whereby said zones are hydraulically connected with each other and with said compartments of said unit,
   a fluidized bed reactor assembly containing at least one each of an aeration zone,
   an internal recirculation zone with portions of upward and downward flows,
   said internal recirculation zone being hydraulically connected to the upper portion of said aeration zone, said internal recirculation zone comprising
   a fluidized bed zone,
   a clear effluent zone,
   a mixing/degassing zone;
   a filtration bed compartment built into said unit,
   said filtration bed compartment being hydraulically connected to said clear effluent zone, wherein the fluidized bed in said fluidized bed compartment contains suspended viable biomass or a physico-chemical reagent admixture or mixture of said biomass and said physico-chemical reagent admixture; and
   a compartment wherein excess sludge is thickened and removed below said aeration zone.

2. The packaged modular type unit claimed in claim 1 wherein said unit contains a plurality of aeration zones.

3. The packaged modular type unit claimed in claim 1 wherein said unit contains a plurality of recirculation zones.

4. The packaged modular type unit claimed in claim 1 wherein said unit contains a plurality of fluidized bed zones.

5. The packaged modular type unit claimed in claim 1 wherein said unit contains a plurality of clear effluent zones.

6. The packaged modular type unit claimed in claim 1 wherein said unit contains a plurality of mixing/degassing zones.

* * * * *